(12) United States Patent
Jain et al.

(10) Patent No.: US 8,509,205 B2
(45) Date of Patent: Aug. 13, 2013

(54) MULTICODE APERTURE TRANSMITTER/RECEIVER

(75) Inventors: Atul Jain, Cerritos, CA (US); David A. Whelan, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 1437 days.

(21) Appl. No.: 12/133,959

(22) Filed: Jun. 5, 2008

(65) Prior Publication Data
US 2009/0303126 A1 Dec. 10, 2009

(51) Int. Cl.
*H04B 7/216* (2006.01)
(52) U.S. Cl.
USPC ........... 370/342; 370/334; 375/267; 375/299; 375/295
(58) Field of Classification Search
None
See application file for complete search history.

(56) References Cited

U.S. PATENT DOCUMENTS

| | | | | |
|---|---|---|---|---|
| 4,974,187 | A * | 11/1990 | Lawton | 708/420 |
| 5,151,921 | A * | 9/1992 | Hashimoto | 375/142 |
| 5,276,455 | A | 1/1994 | Fitzsimmons et al. | |
| 5,793,798 | A | 8/1998 | Rudish | |
| 5,802,266 | A * | 9/1998 | Kanekawa et al. | 714/11 |
| 5,961,463 | A * | 10/1999 | Rhyne et al. | 600/458 |
| 6,351,499 | B1 * | 2/2002 | Paulraj et al. | 375/267 |
| 6,375,618 | B1 * | 4/2002 | Chiao et al. | 600/447 |
| 6,487,433 | B2 * | 11/2002 | Chiao | 600/407 |
| 6,665,825 | B1 * | 12/2003 | Mobin et al. | 714/700 |
| 7,546,467 | B2 * | 6/2009 | Lemma et al. | 713/176 |
| 2002/0021240 | A1 * | 2/2002 | Elam | 342/189 |
| 2002/0122511 | A1 * | 9/2002 | Kwentus et al. | 375/343 |
| 2002/0150065 | A1 * | 10/2002 | Ponnekanti | 370/334 |
| 2003/0036359 | A1 * | 2/2003 | Dent et al. | 455/63 |
| 2003/0086479 | A1 * | 5/2003 | Naguib | 375/144 |
| 2003/0135374 | A1 * | 7/2003 | Hardwick | 704/264 |
| 2004/0087294 | A1 * | 5/2004 | Wang | 455/276.1 |
| 2004/0157644 | A1 * | 8/2004 | Aytur et al. | 455/562.1 |
| 2004/0204026 | A1 * | 10/2004 | Steer et al. | 455/550.1 |
| 2005/0001760 | A1 * | 1/2005 | Mrstik | 342/174 |
| 2005/0078761 | A1 * | 4/2005 | Hottinen et al. | 375/267 |

(Continued)

FOREIGN PATENT DOCUMENTS
EP 1918734 7/2008

OTHER PUBLICATIONS

EMS Technologies, Inc., Passive phased arrays for radar antennas, Dec. 2005, available at http://www.emsdss.com/pdf/PassivePhasedArraysApNote.pdf.

(Continued)

*Primary Examiner* — Ian N Moore
*Assistant Examiner* — Dung B Huynh
(74) *Attorney, Agent, or Firm* — Haynes and Boone, LLP

(57) ABSTRACT

Systems and methods according to one or more embodiments provide for a multicode transmitter/receiver that acts like a high power array when a correlated receiver is used, but acts as a collection of small low gain transmitters when an uncorrelated receiver is used. In one embodiment, a method of transmitting and receiving signals comprises splitting a signal into more than one portion for feeding the signal into separate elements of an array; coding each portion of the signal for transmission through each separate element of the array with a different code respectively; transmitting each coded portion of the signal through a corresponding separate element of the array; receiving the coded portions of the signal by at least one element on a receiver side; decoding the coded portions of the signal; and adding decoded portions of the signal to form a complete received signal.

32 Claims, 4 Drawing Sheets

(56) References Cited

U.S. PATENT DOCUMENTS

| | | | |
|---|---|---|---|
| 2006/0133647 A1* | 6/2006 | Werner et al. | 382/100 |
| 2006/0182166 A1* | 8/2006 | Abou Rjeily et al. | 375/130 |
| 2006/0188031 A1* | 8/2006 | Liu | 375/260 |
| 2006/0210279 A1* | 9/2006 | Hillis et al. | 398/118 |
| 2007/0018884 A1* | 1/2007 | Adams et al. | 342/147 |
| 2007/0165104 A1* | 7/2007 | Khan et al. | 348/14.02 |
| 2007/0173288 A1* | 7/2007 | Skarby et al. | 455/561 |
| 2008/0225375 A1* | 9/2008 | Newberg et al. | 359/279 |

OTHER PUBLICATIONS

Applied Radar & Sonar Technologies GMBH, Active towed array sonar, available at http://www.arstech.de/sonar/active_towed_array_sonar.html.

Prof. David Jenn, Arrays, antennas in systems and active antennas, Lecture Notes, vol. III, available at http://faculty.nps.edu/jenn/EO3602/Vol3v1.3.pdf.

Daniel J. Rabideau, "Nonadaptive MIMO Radar Techniques for Reducing Clutter", Radar Conference, 2008, Radar 08. IEEE, IEEE, Piscataway, NJ, USA, May 26, 2008, pp. 1-6, XP031376277, ISBN: 978-1-4244-1538-0.

Danel J. Rabideau, "Adaptive MIMO Radar Waveforms", Radar Conference, 2008. Radar 08. IEEE, IEEE, Piscataway, NJ, USA, May 26, 2008, pp. 1-6, XP031376313, ISBN: 978-1-4244-1538-0.

Bergin et al., MIMO Phased-Array for SMTI Radar, Aerospace Conference, 2008 IEEE, IEEE, Piscataway, NJ, USA, Mar. 1, 2008, pp. 1-7, XP031256286, ISBN: 978-1-4244-1487-1.

* cited by examiner

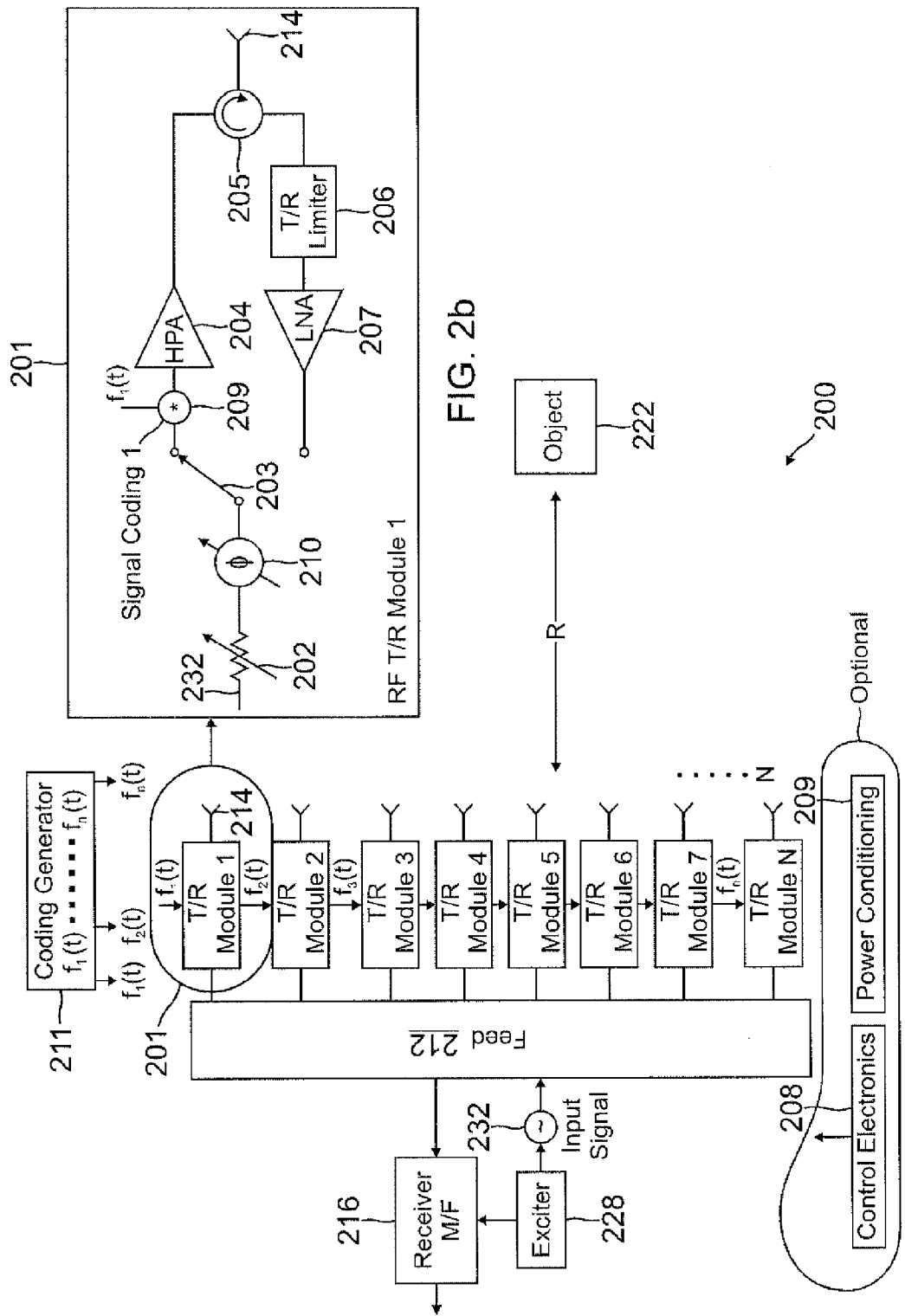

MULTICODE APERTURE TRANSMITTER/RECEIVER

TECHNICAL FIELD

The present disclosure relates generally to transmitter/receiver systems and, more particularly, to multicode transmitter/receiver arrays.

BACKGROUND

Phased array antennas are widely used for directing one or more beams of radiation in desired directions for transmission of radiant energy and for reception of radiant energy. In a typical phased array antenna, there is a plurality of radiators, each of which contains a radiating element of the antenna where the relative phase of radio frequency (RF) waves propagated through each radiating element can be controlled to steer the "beam" of the antenna's radiation pattern. In one type of phased array antenna, known as active arrays (an antenna comprising multiple low power transmitter elements), each radiating element has associated electronics that include amplifiers and phase shifters to support transmit and receive for the radiation.

The distributed nature of the active array architecture offers advantages in a wide variety of applications. As one example, a satellite may include an antenna system of this type that facilitates communication between the satellite and one or more ground stations on earth. However, typical active phased array antenna systems use common transmitter modules and waveforms for each of the independent elements and may give rise to overall issues of Radio Frequency Interference (RFI) or damage with respect to other systems and objects such as Co-channel Interference on cellular communication systems, detected power levels above FCC mandated levels, or radiation damage to living objects.

SUMMARY

In one embodiment, a method of transmitting and receiving signals comprises: splitting a signal into more than one portion for feeding the signal into separate elements of an array; coding each portion of the signal for transmission through each separate element of the array with a different code respectively; transmitting each coded portion of the signal through a corresponding separate element of the array; receiving the coded portions of the signal by at least one element on a receiver side; decoding the coded portions of the signal; and adding decoded portions of the signal to form a complete received signal.

In another embodiment, a multicode array for receiving and transmitting a signal comprises: a feed adapted to receive and split the signal into low power signals; individual elements at a transmitter side of the multicode array wherein each low power signal is coded with different codes respectively and transmitted through each individual element of the multicode array; at least one element at a receiver side wherein the at least one element receives all the low power signals, and a receiver adapted to add decoded low power signals to form a complete received signal.

In another embodiment, a method of transmitting and receiving signals in a high power system comprises: splitting a signal into low power signals; coding the low power signals with different codes; transmitting the coded low power signals through individual elements of an array; receiving the coded low power signals by at least one individual receiver element; decoding the coded low power signals; and adding the decoded signals with a correlated receiver to form a complete received signal, wherein the array acts like a high power transmitter array when the correlated receiver is used, but acts as a collection of small transmitter arrays when an uncorrelated receiver is used.

In another embodiment, a method of receiving signals comprises: receiving coded portions of a signal by at least one receiver element wherein each portion of the signal is coded with a different code respectively; decoding the coded portions of the signal; and adding decoded portions of the signal to form a complete received signal.

In another embodiment, a multicode array comprises: a plurality of modules adapted to process and code portions of a signal; and a correlated receiver comprising at least one correlated receiver element wherein the at least one correlated receiver element receives and decodes coded portions of the signal, wherein the correlated receiver is adapted to add decoded portions of the signal to form a complete received signal.

The scope of the disclosure is defined by the claims, which are incorporated into this section by reference. A more complete understanding of embodiments will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 2a shows a diagram illustrating a multicode aperture transmitter/receiver of an active array for a radar system in accordance with an embodiment.

FIG. 2b shows an exploded view of a T/R RF module 201 of FIG. 2(a) according to an embodiment.

Embodiments and their advantages are best understood by referring to the detailed description that follows. It should be appreciated that like reference numerals are used to identify like elements illustrated in one or more of the figures.

DETAILED DESCRIPTION

Systems and methods according to one or more embodiments provide a multicode transmitter/receiver system that reduces the detected power as seen by an unknown receiver or felt by an object when a phased array antenna is transmitting, while at the same time, maintaining the power relationships of the overall system. In one or more embodiments, the coded transmitter/receiver system transmits a signal that is convolved with orthogonal output waveforms through individual elements of a phased array and that cannot be easily detected by an uncorrelated or unmatched receiver because the uncorrelated receiver sees a very low energy output from each element of the phased array. That is, detected power is reduced as seen by the unmatched receiver or felt by an object (animal, human or inanimate). Each element of the phased array is low gain with a wide angular beamwidth, and the propagation loss for any appreciable distance is significant. A matched or correlated receiver, however, may easily detect returns from its own transmission system because the correlated receiver may coherently combine the received individual signals. The correlated receiver sees high energy as coming from the high gain transmit array antenna having a narrow angular transmission pattern. Radio Frequency Interference (RFI) of the transmitted waveform may be reduced based on the number of orthogonal waveforms used. According to one or more embodiments, the system described herein may assist with power management for several applications including communications systems, radar systems, ultrasound systems, optical systems, infrared systems or other microwave systems.

Figure 1:
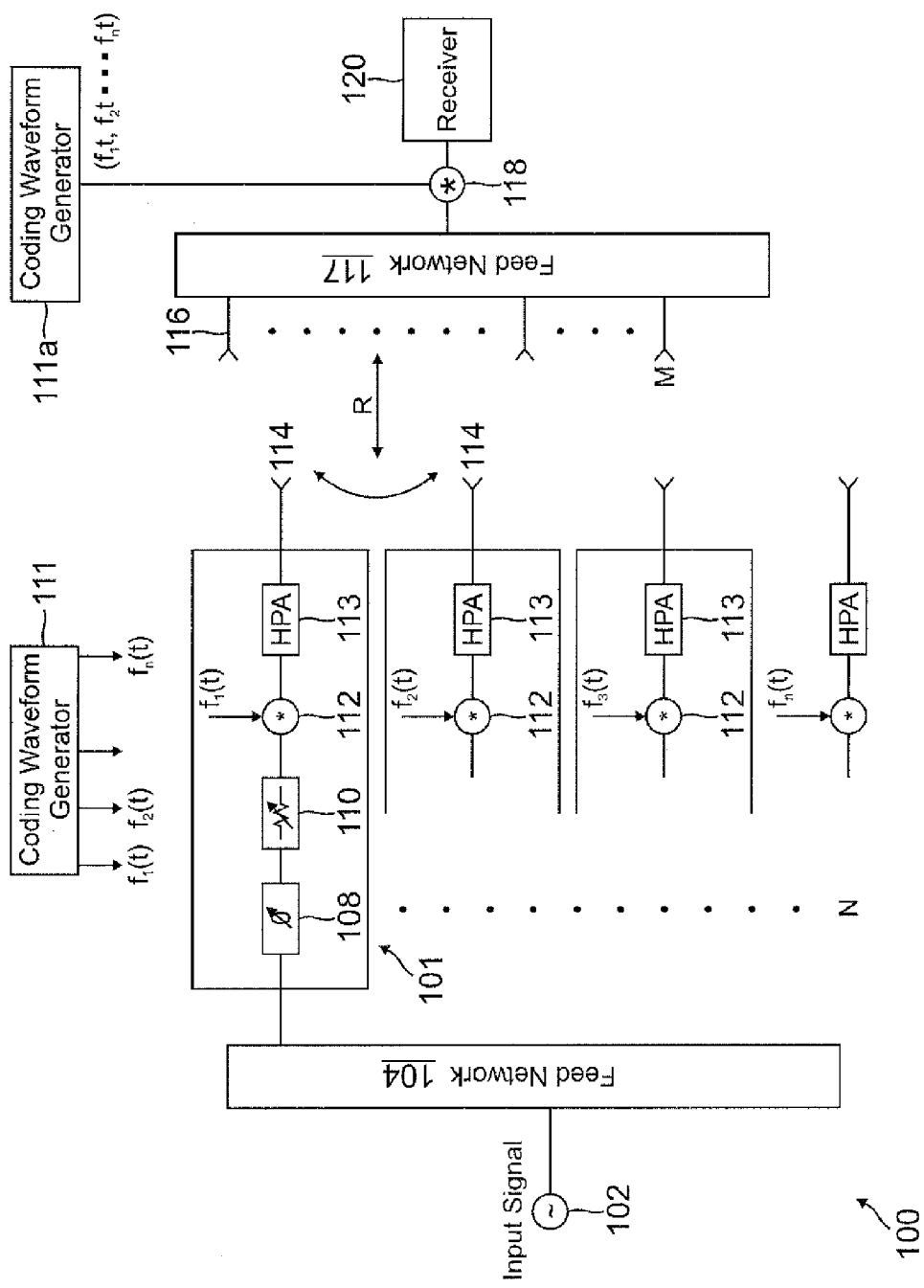
FIG. 1 shows a diagram illustrating a multicode aperture transmitter/receiver for a communications system in accordance with an embodiment.

Referring to FIG. 1, a diagram is shown illustrating a multicode aperture transmitter/receiver for a communications system in accordance with an embodiment. In FIG. 1, in an array antenna transmitter system 100 (also referred to as "active array"), a signal 102 is split into low power signals through a feed network 104. The split signal is then transmitted in the form of multiple coded waveforms that are orthogonal to each other through an N number of RF modules 101 of the array antenna transmitter system 100. One of the RF modules 101 may receive a portion of signal 102 (low power signal) via feed network 104, from where the portion of signal 102 may then be directed to each individual antenna element 114 via a phase shifter 108, a variable attenuator 110, and a correlator 112 that codes the portion of signal 102 by convolution with a coding waveform $f_n(t)$ corresponding to the respective individual antenna element 114. The individual coding waveforms $f_1(t), f_2(t), \ldots, f_n(t)$ may be supplied by a waveform generator 111 to the respective RF module 101, or alternatively, the coding waveforms may be built-in within RF modules 101. General techniques for generating random codes are well known in the art as set forth in the technical literature. See for example "Modern Radar" by Raymond S. Berkowitz (John Wiley & Sons, Inc. NY 1965), at chapter 4.

It will be appreciated that a number of embodiments may exist to split signal 102 and feed it to the multiple antenna elements 114 of the array antenna transmitter system and are well documented. These may include a parallel feed structure or a corporate feed, a series feed, or a space feed. In this embodiment, feed network 104 is a corporate feed system. Thus, signal 102 may be split into low power signals or portions, and each portion of split signal 102 may be individually coded. Each coded portion of signal 102 may then be directed through a high power amplifier (HPA) 113 to be transmitted through the corresponding individual element 114 of the N-element array antenna transmitter system for a practical distance "R" such that M correlated receiver elements 116 are programmed to detect and decode all of the transmitted N coded portions of signal 102. The N individual elements 114 may be coordinated in phase to achieve high gain and high power as well as controlled direction from coherent summation of radiation from each individual element 114. The radiation from all the transmitted coded portions of signal 102 is received at the M correlated receiver elements 116, where it is coherently integrated and processed. The M correlated receiver elements 116 may be a single element, for M equal to one, or may include multiple M correlated receiver elements in the case of a phased array receiver. The coded radiation of each coded portion of signal 102 that is received at the M correlated receiver elements 116 may be combined through a receive feed network 117. The combined signal may then be decoded at correlator 118 for each of the coded waveforms by convolution with the sum of the complex conjugate of the coding waveforms used at the transmitter elements. Correlator 118 may be integrated into receiver 120 or it may be separate from receiver 120, and it may be either placed before receiver 120 or after receiver elements 116 and before feed network 117. The decoded signals may then be added to give the final received signal. The coding waveforms may be supplied by a corresponding waveform generator 111a at the receiver side or they may be stored in memory at receiver 120. Consequently, this system operates as a normal communications system and sees the transmitter as a high power, high gain transmitter.

In the case where receiver 120 is an unmatched or uncorrelated receiver, receiver 120 may detect the transmitted coded signals from the N individual elements 114, however, the uncorrelated receiver 120 will not be able to match filter or decode all the coded signals and coherently add them simultaneously because it lacks knowledge of all the codes that were used in generating the transmitted signal. Instead, the uncorrelated receiver 120 observes the coded split signal 102 as being very low power signals and will only be able to detect the incoherent sum of the radiated energy from each individual element 114, which is very low at any practical distance R because of the broad angular beamwidth of the radiation pattern from each element. Uncorrelated receiver 120, therefore, detects radiation from the N individual elements 114 as low power because the uncorrelated receiver 120 sees the antenna as a transmitter with the beam pattern of its individual element 114, that is, the pattern of the energy is the far field pattern of an individual array element.

In FIG. 1, for individual elements 114 radiating power "$P_e$", where $G_e$ is the gain of the individual element 114, the power density "$P_D$" at a distance "R" for a proportionality constant $K_c$ that accounts for the transmission medium is:

$$P_D = K_c P_e G_e / 4\pi R^2$$

For "N" elements of the array, where "$P_e$" is the power per element, the power combines to generate a power density "$P_D$" at a distance "R" as:

$$P_D = K_c N P_e G_e / 4\pi R^2$$

This assumes that the waveforms from the individual elements 114 are not correlated and so they do not combine coherently. If no coding $f_n(t)$ is applied to the portions of the signal 102, or if all the output portions of the signal 102 radiated from the elements 114 have the same coded waveforms, then the transmitted radiation from the elements 114 combines coherently for a transmitted power of ($N^2 P_e$) and the array antenna gain of ($NG_e$), and the power density at distance "R" is:

$$P_D = K_c N^3 P_e G_e / 4\pi R^2$$

If a correlated receiver element 116 is provided at distance "R", it will be able to decode all the waveforms from the "N" individual elements 114 and will combine them coherently. In this case, the power density "$P_D$" of correlated receiver elements 116 at distance "R" is the same as if all the transmitted coded waveforms were the same or if no coding was applied at elements 114 of the transmitter:

$$P_D = K_c N^3 P_e G_e / 4\pi R^2$$

That is, the power density will be "$N^2$" times higher for a correlated receiver or an array transmitter with the same waveforms for each element than for an uncorrelated receiver and a transmitter with orthogonal coded waveforms for each transmitting element. Consequently, RFI or radiation hazard is reduced by a factor of $N^2$ for a multicode aperture transmitter/receiver while equivalent performance is maintained.

Referring now to FIG. 2(a), a diagram is provided illustrating a multicode aperture transmitter/receiver of an active array for a radar system in accordance with an embodiment.

Referring also to FIG. 2(b), an exploded view of a T/R RF module 201 of FIG. 2(a) is illustrated according to an embodiment. In FIG. 2(a), an active array may act as a transmitter for which it may also act as a receiver in the case of a radar system 200. A signal 232 from an exciter 228 is split into low power signals, which are supplied to "N" transmitter/receiver (T/R) RF modules 201 through a feed 212. As shown in FIG. 2(b), each portion of the split signal 232 is amplitude adjusted in an attenuator 202 and phase shifted in a phase shifter 210 at each RF module 201 site to produce a desired radiation beam to illuminate a target object 222 at a distance "R". For illustration purposes, transmitter/receiver (T/R) switch 203 is shown in the transmit mode of operation. Each portion of signal 232 may be convolved with a coding waveform $f_n(t)$ at a correlator 209 for transmission to a respective antenna element 214. Each of the coding waveforms for the different elements 214 may be orthogonal to each other. The coding waveforms may be supplied by a signal generator 211 or may be stored at the respective RF modules 201. General techniques for generating random codes are well known in the art as set forth in the technical literature. During the transmit mode of the radar system 200, T/R switch 203 is connected thereto so that the split signal 232 is amplified by transmit driver and final amplifiers 204, and routed through a circulator 205 to an individual element 214.

During the receive mode of radar system 200, radar system 200 return signals are routed back through circulator 205, a receiver protector or T/R limiter 206 and a low noise amplifier 207. The amplified return signal is amplitude adjusted and phase shifted in the same attenuator 202 and phase shifter 210 respectively. The return signal is then routed to feed 212 and then combined after being decoded with the matched filters for each of the coded waveforms at matched filter receiver 216. The decoding may be done in receiver 216 by convolution of the combined received signal with the complex conjugate of the sum of the coding waveforms, $[f_1(t)^* + f_2(t)^* + \ldots + f_n(t)^*]$, which are used to code the individual split portions of signal 232 at the transmitter elements 214. Here, the * sign denotes the complex conjugate, i.e., $f(t)^*$ is the complex conjugate of $f(t)$.

In one or more embodiments, control electronics 208 or power conditioning block 209 may be provided. Control electronics 208 may serve to interface RF module 201 to the array controllers, providing beam steering and timing information needed by RF module 201. Power-conditioning block 209 may provide the necessary sequential biases and switching commands for the respective RF module 201 components.

The amplitude weighting (through attenuator 202) in the transmit and receive modes may be used for synthesizing the low sidelobe pattern of the array both during transmit and receive modes. For a pulsed radar, during transmit, the receive side low noise amplifier 207 output is turned off and during receive, the transmit amplifier input is turned off by T/R switch 203. The radar system dead time may be utilized for changing the phase and attenuator values and for switching channel select T/R switch 203. Other types of radars may include a Continuous Wave (CW) radar with independent Transmitter-Receivers, or an FM-CW radar that may receive while transmitting and that is not pulsed but may use the same coding technique to manage detected power.

Figure 2C:
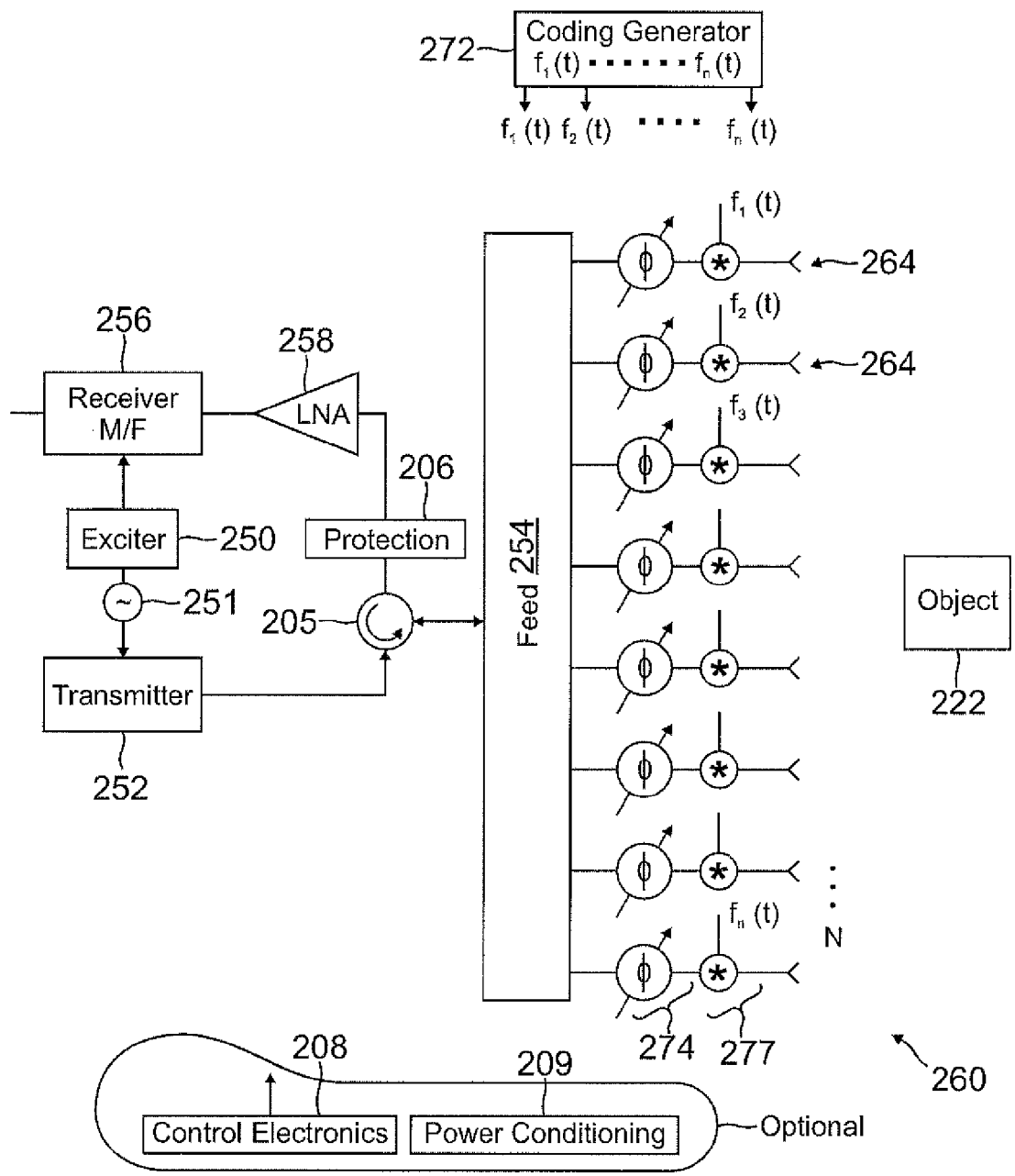
FIG. 2c shows a diagram illustrating a multicode aperture transmitter/receiver of a conventional phased array for a radar system in accordance with an embodiment.

Referring to FIG. 2c, a diagram illustrating a multicode aperture transmitter/receiver of a conventional phased array for a radar system is shown in accordance with an embodiment. In this embodiment where a conventional phased array is used instead of an active array, transmitter 252 provides the amplification of an input signal 251 from exciter 250 prior to splitting the signal 251 at feed 254. The portions of split signal 251 are phase shifted through phase shifters 274. The coded waveforms $f_n(t)$ are convolved with the individual portions of split signal 251 at correlators 277 prior to transmission through individual transmitting elements 264. Coded waveforms $f_n(t)$ may be supplied by a coding generator 272.

The target object 222 is illuminated by the portions of signal 251 (or multiple low power signals) transmitted through each individual element 264, seemingly not correlated to each other, and therefore, target object 222 might not detect that it is being illuminated with microwave radiation. The reflected signals, however, may be received through a low noise amplifier 258, and will be decoded by the receiver 256 located at the same antenna, and the resultant decoded signals will be added together to create a strong signal. Thus, in the receive mode of the radar system 260, radiation from each individual transmit element 264 of the array is correlated and receiver 256 is able to detect and perform coherent addition of all N coded transmissions for all the waveforms in the return signal.

It will be appreciated that as in typical active phased arrays, each individual element 214 (as illustrated in FIG. 2(a)) corresponds to an RF module 201, therefore, there may be N individual elements 214 that comprise the radar system illuminating target object 222. In typical radar systems, the beam illuminates an object of interest and energy is scattered back to the antenna. The receive elements of the antenna combine the energy received by the individual elements to achieve an increased gain that is equivalent to the physical size of the collection of elements forming an antenna array. Consequently, the coherent addition for a phased array achieves a high gain both for transmit and receive as well as addition of transmitted power from individual low power elements, effectively increasing the power density on the target object of interest and the collected power scattered by the target object.

High power radiation and gain is thus achievable by a correlated receiver, however, radiation is detected as low power at any distance by an uncorrelated receiver or a target object. The phased array, therefore, coherently integrates the transmit/receive patterns and has the effective transmit/receive gain of a full sized antenna enabling the system to effectively act as a high gain transmit/receive antenna.

According to one or more embodiments for a radar system, a target object 222 may be illuminated and waveforms returned as described with respect to FIGS. 2(a)-2(c). For a radar system having correlated receivers for each of the receiver individual elements 214 (FIGS. 2(a)-2(b)) or 264 (FIG. 2(c)), the power detected is:

$$P_D = [K_r N^4 P_e G_e G_R \lambda^2 \sigma / (4\pi)^3 R^4]$$

where "$\sigma$" is the cross-section of target object 222 doing the scattering, $K_r$ is a constant depending upon the transmission medium for the radar system, $G_R$ is the antenna element gain when in the receive mode resulting in the effective array receive gain of ($NG_R$) and $\lambda$ is the wavelength of the radiation. The transmit power is ($N^2 P_e$) and the effective array transmit gain is ($NG_e$). $P_D$ in this case is the power detected by a conventional phased array radar, where no coding was used. For this radar system, the power density $P_D$ at distance "R" will be the same as described for the communications system in FIG. 1. If a correlated receiver is present at distance "R" then the power density will be:

$$P_D = K_c N^3 P_e G_e / 4\pi R^2.$$

If the receiver at distance "R" is uncorrelated, or if the radiation is incident on an object at distance "R", then the power density seen by the uncorrelated receiver or the object will be:

$$P_D = K_c N P_e G_e / 4\pi R^2$$

From these equations, it will thus be appreciated that a multicode aperture radar provides equivalent performance while reducing the power density incident at distance "R" by a factor of $N^2$.

One or more embodiments utilize the gain that is achievable from a phased array antenna to get a factor of $N^2$ improvement in a radar or communications system performance for N individual elements of the array for power density at a density that would be equivalent to that from independent individual elements of the array.

According to one or more embodiments, power management is achieved as the phased array antenna is configured to look like and have the properties of a full sized antenna, but looks like a collection of small antennas to uncorrelated receivers or target objects. An external receiver or target object sees a very low output of power from the system, making the system less detectable with very low RFI while delivering the necessary power density.

Although a transmitter/receiver system has been described with respect to a communications system (FIG. 1) as well as radar systems (FIGS. 2(a)-2(c)), there are other applications that would benefit from the configuration of this phased array architecture. For example, in the case of an ultrasound system, the phased array antenna may be replaced by an array of ultrasound transmitters or ultrasound transmitter/receivers, and in the case of an optical or infrared system, the phased array antenna may be replaced by an array of optical or infrared transmitters or optical or infrared transmitter/receivers.

Figure 3:
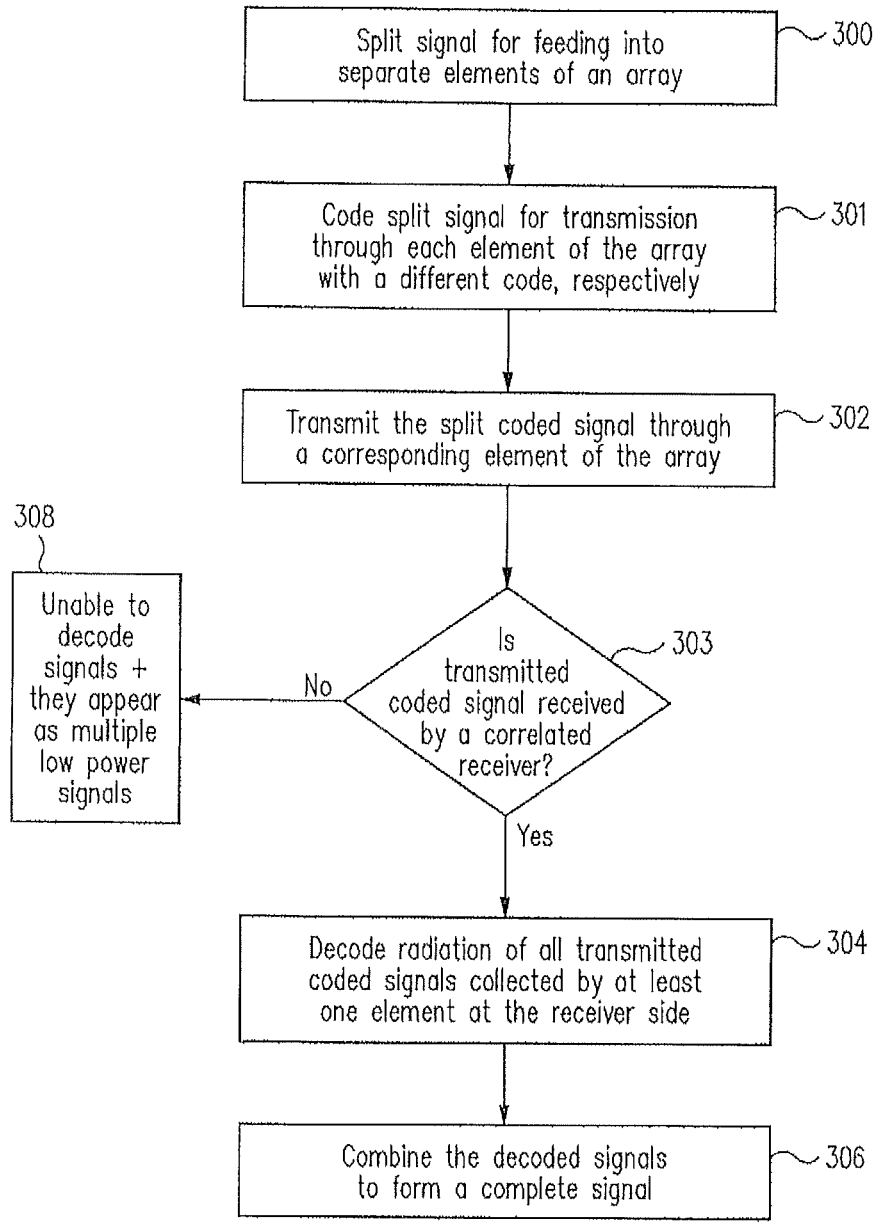
FIG. 3 shows a flow diagram illustrating a method for transmitting/receiving signals according to an embodiment.

Referring now to FIG. 3, a flow diagram illustrating a method for transmitting/receiving signals according to an embodiment is provided. The method of FIG. 3 may be implemented with the communications system shown in FIG. 1 where the active array acts as a transmitter with an external cooperative correlated receiver. Also, the method of FIG. 3 may be implemented with the radar systems shown in FIGS. 2(a)-2(c) where the phased array acts as a transmitter and a receiver and illuminates an external target object 222. Furthermore, the method of FIG. 3 may be implemented in other applications such as an ultrasound system where the phased array antenna may be replaced by an array of ultrasound transmitters or ultrasound transmitter/receivers or an optical or infrared system where the phased array antenna may be replaced by an array of optical or infrared transmitters or optical or infrared transmitter/receivers.

In block 300, a signal is split into low power signals for feeding into separate elements of an array. As described with respect to FIGS. 1 and 2(a)-2(c), the signal is split and each individual portion (low power signal) of the split signal may be coded with waveforms orthogonal to each other and then transmitted through the corresponding individual element 114, 214, 264 of a phased array.

In block 301, the portions of the signal transmitted through each individual element of the array are coded with a different code respectively.

In block 302, each individual element of the array separately transmits the corresponding coded portion of the signal. The coding from the different individual elements is different and orthogonal, that is, an object in space sees the energy from each transmitting element as independent.

In block 303, it is determined whether the transmitted coded portions of the signal are received by a correlated receiver. If not, in block 308, an uncorrelated receiver is unable to decode the transmitted coded portions of the signal. The radiation from the individual elements 114, 214, 264, for example, does not combine at an external receiver in the case of a communications system, nor at a target object or at a radar receiver in the case of a radar system, to appear as if the energy is coming from a single large antenna. Consequently, the coherent addition in power and the increase in gain for an antenna size equivalent to the collection of individual elements 114, 214, 264 do not occur at the external receiver or at the target object. The power detected by the uncorrelated receiver individual elements 116 (FIG. 1) or seen by the target object 222 (FIGS. 2(a)-(c)), for example, is the incoherent addition of radiation from a collection of low power non-directional antenna elements, which is very low when the loss from propagation to the target object or receiver is taken into account.

In block 304, if the transmitted coded portions of the signal are received by a correlated receiver, then at least one array element at the receiver side collects the radiation for all the different transmitted coded signals. The collected signal is then fed to the receiver through the feed. In the communications system of FIG. 1, each individual element 116 on an external receiver side collects all the portions of signal 102 and sends them to the receiver 120 where the transmitted signals are decoded and added to form the received signal. In the radar systems of FIG. 2(a)-2(c), each individual element on a correlated receiver side at the array collects and amplifies all the return coded signals and sends them through the feed to the receiver where they are decoded and added to form the detected return signal. In an optical or infrared system the antenna array may be replaced by optical or infrared laser transmitter/receivers such as laser diode transmitter arrays and receive heterodyne detectors or detector arrays. In an ultrasound system the antenna array may be replaced by ultrasound transmitter arrays/receivers.

In block 306, all the multiple decoded signals from all the array elements are combined or added. Thus, the array sees the received signals as if they were a high power, high gain transmitter and a high gain receiver, and operates as a conventional high power array system.

According to one or more embodiments, the coded transmitter/receiver system may assist in power management for microwave, optical, ultrasonic or other equipment. In many applications, it is desired to radiate power at levels as low as possible to avoid interference with other equipment and minimize radiation hazards to animate (people or animals, for example, an application would be in avoiding damage to dolphins and whales from Navy sonar testing) or inanimate objects (trigger explosives, damage equipment, etc.). At the same time, radiation of adequate power is necessary so that the equipment functions properly, that is, in the case of a radar system, adequate signal to noise ratio for a given range is desired. In the case of a communications system, adequate power to get acceptable bit error rate is desired.

Embodiments described above illustrate but do not limit the disclosure. It should also be understood that numerous modifications and variations are possible in accordance with the principles of the present disclosure. Accordingly, the scope of the disclosure is defined only by the following claims.

We claim:

1. A method of transmitting and receiving signals, the method comprising:

splitting a signal into two or more low power portions for feeding the signal into separate elements of an array;

coding each low power portion of the signal for transmission through each separate element of the array with a different code respectively, wherein the coding comprises convolving the low power portion of the signal with the respective different code individually corresponding to the respective separate element;

transmitting each coded portion of the signal through a corresponding separate element of the array;

receiving the coded portions of the signal by at least one element on a receiver side, wherein receiving the coded portions of the signals further comprises receiving return signals at the at least one element on the receiver side upon illuminating a target object;

decoding the coded portions of the signal; and adding decoded portions of the signal with a correlated receiver to form a complete received signal, wherein the array acts like a high power transmitter array when the correlated receiver is used, but acts as a collection of small transmitter arrays when an uncorrelated receiver is used.

2. The method of claim 1, wherein the array further comprises an active antenna array or a conventional phased array.

3. The method of claim 1, wherein the splitting the signal further comprises using a corporate feed system.

4. The method of claim 1, wherein the at least one element on the receiver side further comprises multiple separate receiver elements wherein each separate receiver element receives all the coded portions of the signal.

5. The method of claim 1, wherein the coding each portion of the signal for transmission through each separate element further comprises coding each portion of the signal respectively with coded waveforms that are orthogonal to each other.

6. The method of claim 1, wherein the array further comprises an ultrasound, an optical or an infrared transmitter/receiver array.

7. The method of claim 2, further comprising using the active antenna array in a communications system or in a radar system.

8. The method of claim 7, wherein the receiving the coded portions of the signal by the at least one element on the receiver side of the radar system further comprises receiving the coded portions of the signal reflected from a target object by separate receiver elements at the active antenna array.

9. The method of claim 7, wherein the at least one element on a receiver side in the communications system is located externally with an external receiver.

10. The method of claim 1, wherein the decoding comprises convolving the coded portions of the signal with a complex conjugate of a sum of the different codes.

11. A multicode array for receiving and transmitting a signal comprising:

a feed adapted to receive and split the signal into low power signals;

individual elements at a transmitter side of the multicode array wherein each low power signal is coded with different codes respectively and transmitted through each individual element of the multicode array, wherein the coding with different codes comprises convolving each low power signal with the different code individually corresponding to the respective individual element;

at least one element at a receiver side wherein the at least one element receives all the low power signals, wherein receiving the coded, low power signals further comprises receiving return signals at the multicode array upon illuminating a target object; and a correlated receiver adapted to add decoded low power signals to form a complete received signal, wherein the multicode array acts like a high power transmitter array when the correlated receiver is used, but acts as a collection of small transmitter arrays when an uncorrelated receiver is used.

12. The array of claim 11, wherein the at least one element at the receiver side further comprises multiple separate receiver elements.

13. The array of claim 11, further comprising control electronics and a power conditioning block.

14. The array of claim 11, further comprising an active antenna array or a conventional phased array.

15. The array of claim 14, wherein the active antenna array is adapted for use in a communications system or in a radar system.

16. The array of claim 15, wherein the at least one element at the receiver side in the communications system is located externally with an external receiver.

17. The array of claim 14, wherein the at least one element at the receiver side in the radar system is part of the active antenna array itself.

18. The array of claim 11, further comprising an ultrasound, an optical or an infrared receiver/transmitter array.

19. The array of claim 10, wherein the different codes further comprise coded waveforms that are orthogonal to each other.

20. The array of claim 19, wherein the different codes are supplied by a waveform generator.

21. The array of claim 11, further comprising a correlator located external to the receiver, wherein the correlator is adapted to decode the low power signals received from the at least one element at the receiver side and to supply decoded low power signals to the receiver.

22. The array of claim 11, further comprising at least one transmit/receive (T/R) module.

23. The array of claim 22, wherein the different codes are built-in within the at least one module.

24. The array of claim 11, wherein the receiver further comprises a memory for storing coded waveforms for decoding the low power signals received from the at least one element at the receiver side.

25. A method of transmitting and receiving signals in a high power radar system, the method comprising:

splitting a signal into low power signals;

coding the low power signals with different codes, wherein the coding comprises convolving each low power signal with the different code individually corresponding to a respective separate element of an active antenna array;

transmitting the coded low power signals through the individual elements of the active antenna array;

receiving the coded low power signals by at least one individual receiver element, wherein receiving the coded low power signals further comprises receiving return signals at the active antenna array upon illuminating a target object;

decoding the coded low power signals; and adding the decoded signals with a correlated receiver to form a complete received signal, wherein the active antenna array acts like a high power transmitter array when the correlated receiver is used, but acts as a collection of small transmitter arrays when an uncorrelated receiver is used.

26. The method of claim 25, comprising an active antenna array for a communications system wherein the correlated receiver is located externally.

27. The method of claim 25, comprising an ultrasound system wherein the array comprises an ultrasound, an optical or an infrared transmitter/receiver array.

28. The method of claim 25 wherein the coded low power signals comprise waveforms that are orthogonal to each other.

29. A method of receiving signals, the method comprising:
   receiving coded, low power portions of a signal by at least one receiver element wherein each portion of the signal is coded with a different code respectively, wherein the coding comprises convolving the portion of the signal with the different code individually corresponding to the respective portion of the signal, and wherein receiving the coded, low power portions of the signal further comprises receiving return signals at the at least one receiver element upon illuminating a target object;
   decoding the coded portions of the signal; and
   adding decoded portions of the signal with a correlated receiver to form a complete received signal, wherein the signal appears to come from a high power transmitter array when the correlated receiver is used, but appears to come from a collection of small transmitter arrays when an uncorrelated receiver is used.

30. The method of claim 29 further comprising transmitting each coded portion of the signal through separate transmitter elements of an array.

31. A multicode array comprising:
   a plurality of modules adapted to process and code low power portions of a signal, wherein each coded, low power portion of the signal comprises a low power portion of the signal convolved with a different code individually corresponding to the respective low power portion of the signal; and
   a correlated receiver comprising at least one correlated receiver element wherein the at least one correlated receiver element receives and decodes the differently coded, low power portions of the signal wherein:
      receiving the differently coded portions of the signal further comprises receiving return signals at the at least one correlated receiver element upon illuminating a target object;
      the correlated receiver is adapted to add decoded portions of the signal to form a complete received signal; and
      the multicode array acts like a high power transmitter array when the correlated receiver is used, but acts as a collection of small transmitter arrays when an uncorrelated receiver is used.

32. The array of claim 31 further comprising individual transmitter elements coupled to each module wherein each portion of the signal is coded with a different code that is orthogonal to each code for a different portion of the signal and transmitted through each individual transmitter element of the multicode array.

* * * * *